May 14, 1929.  A. E. GORANSON ET AL  1,713,278
FRICTION CLUTCH
Filed July 18, 1927  2 Sheets-Sheet 1

Inventors
Albert E. Goranson
Martin C. Willene
By Shilson & McCanna
Att'ys

May 14, 1929.    A. E. GORANSON ET AL    1,713,278
FRICTION CLUTCH
Filed July 18, 1927    2 Sheets-Sheet 2
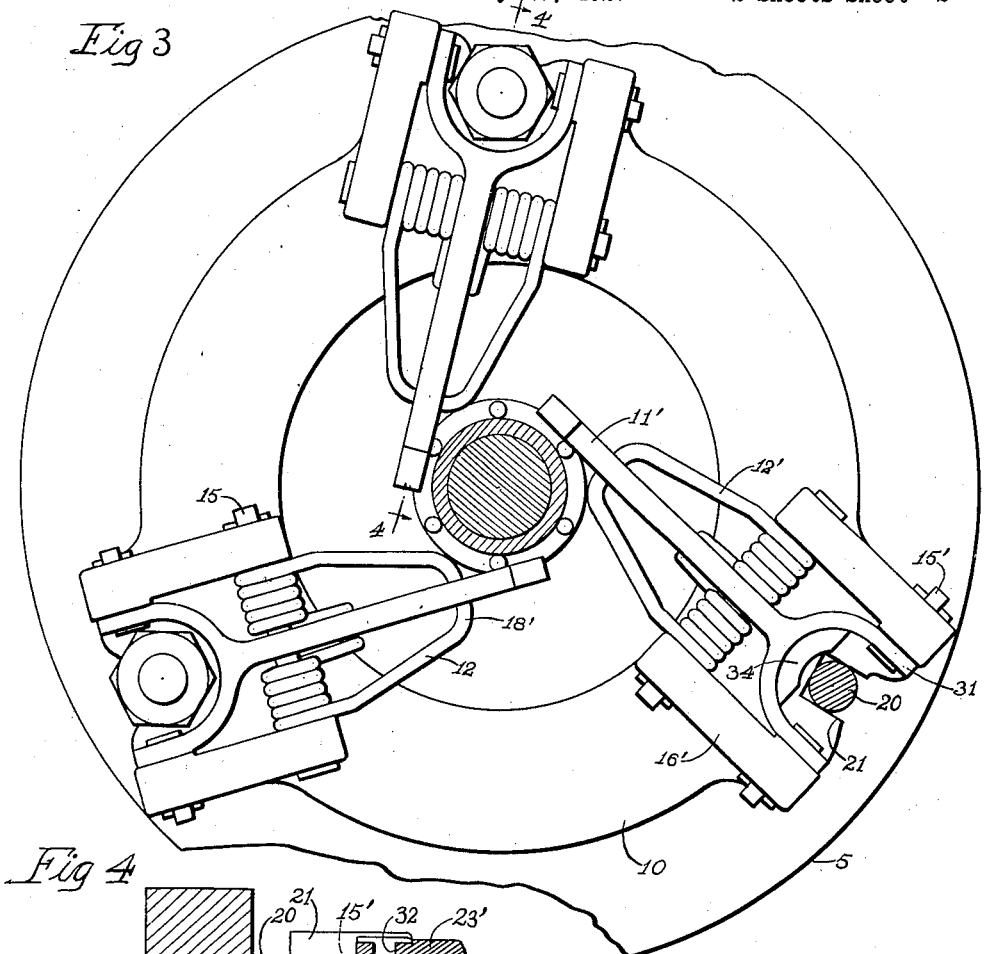
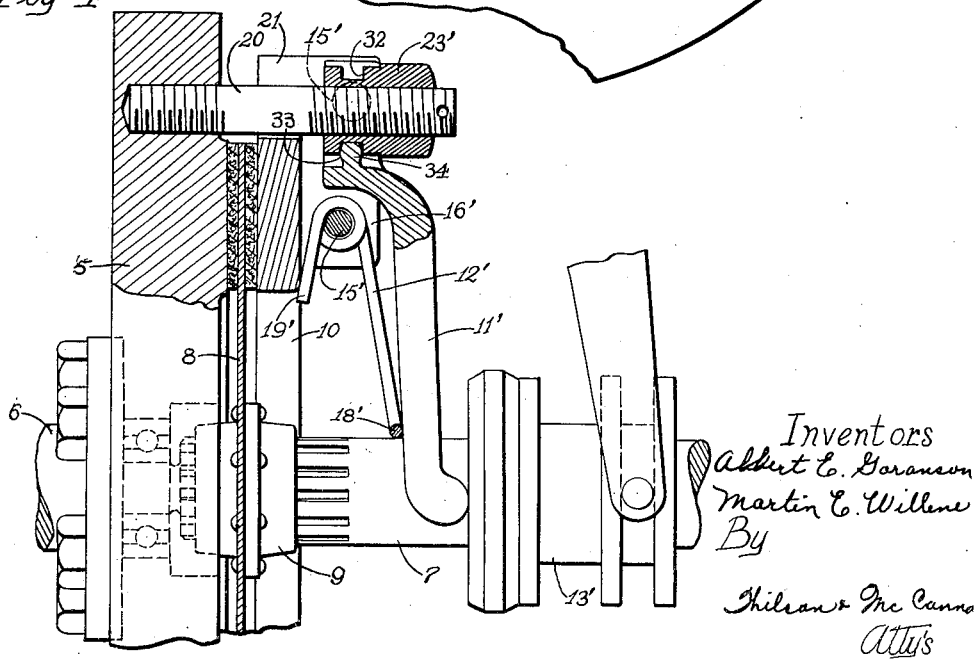
Inventors
Albert E. Goranson
Martin E. Willene
By
Wilson & McCanna
Att'ys Patented May 14, 1929.

1,713,278

UNITED STATES PATENT OFFICE.

ALBERT E. GORANSON AND MARTIN E. WILLENE, OF ROCKFORD, ILLINOIS, ASSIGNORS TO ROCKFORD DRILLING MACHINE COMPANY, OF ROCKFORD, ILLINOIS, A CORPORATION OF ILLINOIS.

FRICTION CLUTCH.

Application filed July 18, 1927. Serial No. 206,520.

This invention relates to friction clutches of the disk type especially adapted for use on motor vehicles.

The principal object of our invention is to provide a clutch principally characterized by the elimination of the usual back plate, designed with a view to greater ease in assembling, less troublesome adjustment, and all-around simplicity, sturdiness, and economy in construction.

Among the features incorporated in the clutch of our invention are, first, the use of coiled springs of the door-spring type, one of which is provided for each of a plurality of levers and is arranged for easy assembling with the lever on the pressure plate and serves by action between the pressure plate and the levers normally to move the pressure plate toward engaged position; second, the provision of studs or posts on the fly wheel projecting rearwardly therefrom through openings in the pressure plate so as to maintain the pressure plate in proper relation to the fly wheel and at the same time provide abutments for the levers behind the pressure plate whereby the pressure plate is normally urged toward the fly wheel to engage the clutch disk or disks therewith; and, third, the provision of adjusting nuts on the posts which are readily accessible through the inspection plate opening of the fly wheel housing for the adjustment thereof to vary the tension of the springs and compensate for wear in the clutch.

The invention is illustrated as embodied in clutches of both the pull and the push types as will be observed in the accompanying drawings, wherein—

Figure 1:
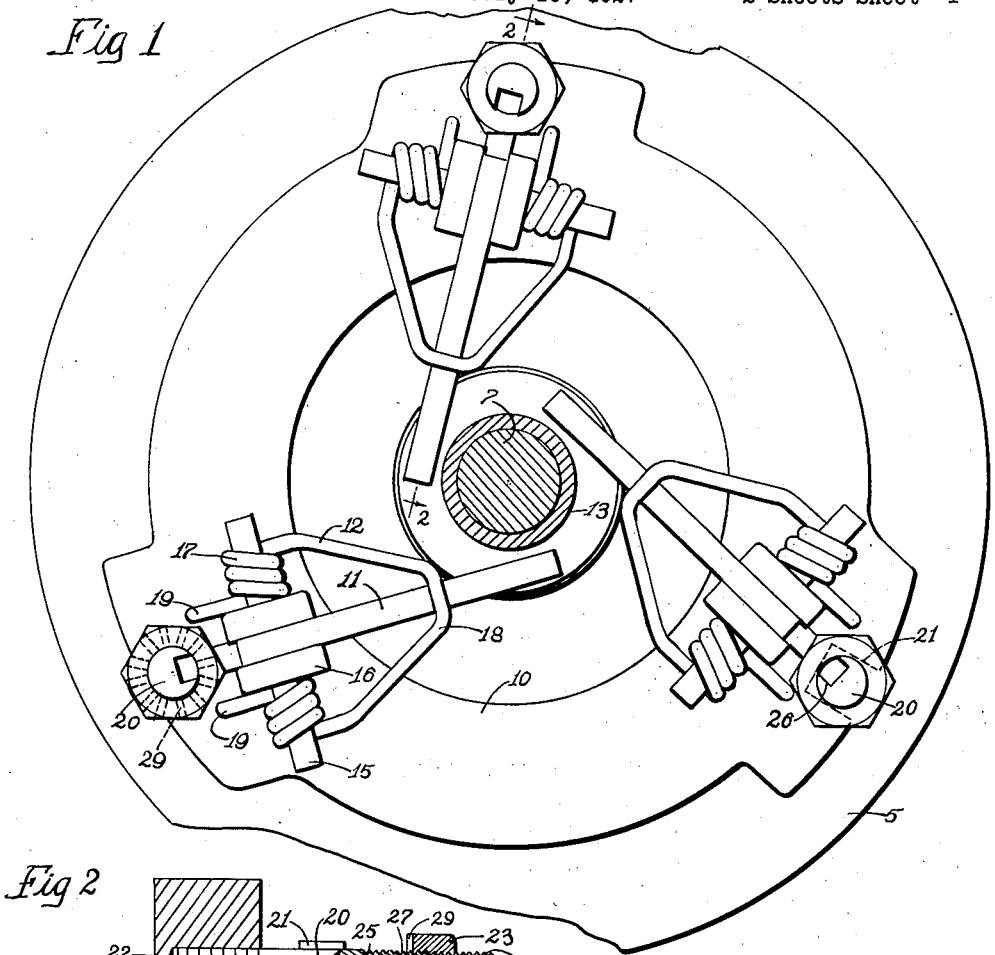
Figure 2:
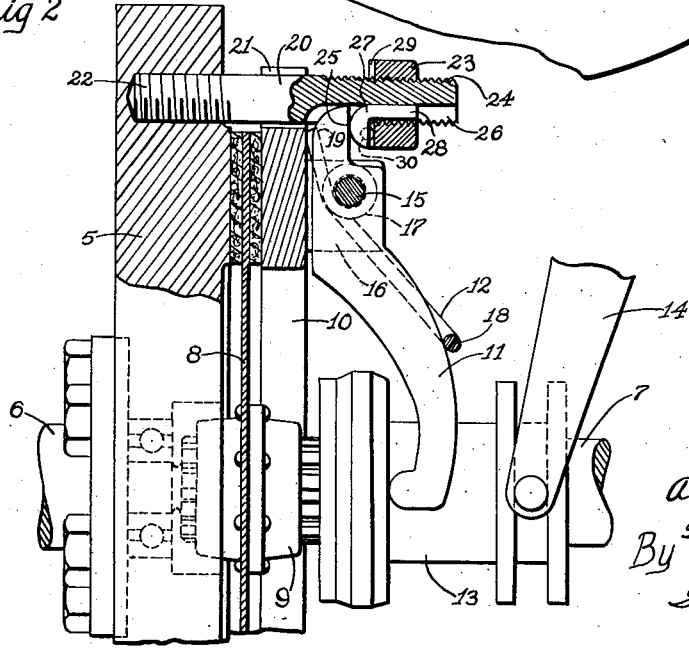

Figs. 1 and 3 are rear views of clutches of the pull and push types, respectively; and Figs. 2 and 4 are sections taken on the lines 2—2 of Fig. 1 and 4—4 of Fig. 3, respectively.

The same or similar reference numerals are applied to corresponding parts throughout the views.

As stated above, the clutch of our invention is one built without the usual back plate to serve as a backing for the springs acting against the pressure plate and as a mounting for the levers which actuate the pressure plate. Clutches of this kind provided in the past have invariably been of complicated and expensive construction and were difficult to assemble and also unhandy to adjust. It is, therefore, the principal object of our invention to provide a clutch of the kind referred to which, if anything, is simpler in construction than the ordinary type of clutch, easier to assemble, handy to adjust, and over and above this is cheaper to manufacture. A further salient feature of our invention lies in the fact that it can be incorporated with equal facility in clutches of either the pull or push type.

Referring first to Figs. 1 and 2, which show a clutch of the pull type, the reference numeral 5 is applied to a fly wheel mounted on a coupling flange provided on the rear end of the crank shaft 6. The fly wheel, of course, constitutes the driving element. A shaft 7 is the driven element and ordinarily extends rearwardly into the gear box of the transmission, there being a housing about the fly wheel and clutch assembly at the front end of the gear box, as is well known. The housing usually has an inspection plate which, when removed, affords access to the clutch for purposes of adjustment. The clutch comprises a disk 8 on a hub 9 splined, as shown, on the forward end of the shaft 7, and a pressure plate 10 arranged to engage the disk 8 with the fly wheel 5. In the ordinary type of clutch a plurality of springs act between the pressure plate 10 and a back plate bolted onto the rim of the fly wheel normally to keep the clutch firmly engaged, and levers are provided acting between the pressure plate and the back plate to disengage the clutch against the action of the springs. In the present case, however, a plurality of levers 11 are provided which, through the instrumentality of springs 12 acting between the pressure plate 10 and the levers 11, serve normally to urge the pressure plate 10 toward the fly wheel 5 to frictionally engage the disk 8 therebetween. The disengagement of the clutch is brought about by a rearward movement of a throw-out sleeve 13 operated by the yoke 14 in the usual manner. The levers 11, which may be of stamped sheet metal for cheapness, are pivoted on pins 15 passed through openings in lugs 16 provided on the back of the pressure plate 10. The plate 10 is suitably cast with the lugs 16 as integral parts thereof. The springs 12, it will be noticed, are of the door-spring type with the coiled intermediate parts 17 thereof received on the projecting ends of the pins 15, one active end 18 of each spring bearing against the back of one of the levers 11 and the other active end 19 bearing against the back of the pressure plate 10. The springs are suitably of a double coil form so that the active end 18 is provided at approximately the mid point of the length of wire from which the spring is formed. It will be obvious, however, that a single coiled form of spring might be employed without departing from our invention. Each of the springs 12 obviously tends to rock its lever 11 in a clockwise direction as viewed in Fig. 2. Thus, when the levers 11 find abutment on the posts 20 at their outer ends, the springs 12 act to urge the pressure plate 10 toward the fly wheel 5 frictionally to engage the clutch disk 8 in a manner believed to be self-evident. The plate 10 has cast in the periphery thereof openings 21 for the reception of the posts 20. The latter are suitably in the form of studs threaded, as indicated at 22, for engagement in holes in the rim portion of the fly wheel 5 and projecting rearwardly through the openings 21 to a point substantially behind the pressure plate 10. Nuts 23 thread on the threaded ends 24 of the posts 20 and provide the abutments for the outer ends of the levers 11 at 25. It will be observed that the posts 20 have key-ways 26 milled therein for a substantial part of the projecting length thereof. The outer ends of the levers 11 are engaged in said key-ways and bear against the rounded offset ends 27 of keys 28 received in the key-ways 26. The nuts 23 hold the keys 28 in place to back up the outer ends of the levers 11, as will be evident. Adjustment of the nuts 23 obviously increases the tension of the springs 12 and serves to compensate for wear in the clutch facings. We prefer to provide a plurality of radial grooves 29 on the inner face of each of the nuts 23 and to provide a ball detent 30 in a socket in the key 28 to fit into any one of the grooves 29 so as to lock the nut 23 after the adjustment thereof. This dispenses with the necessity for a lock nut, cotter pin, or other expedient.

The operation of the clutch is believed to be clear from the description. When the throw-out sleeve 13 is forward the springs 12, acting between the pressure plate 10 and the levers 11, tend to turn the levers 11 about their pivot pins 15 in a clockwise direction and hence urge the pressure plate 10 toward the fly wheel 5 to frictionally engaged the clutch disk 8. However, when the throw-out sleeve 13 is moved to the rear, the levers 11 turn in a counter-clockwise direction on their pivot pins 15 against the action of the springs 12 to retract the pressure plate 10 and thus disengage the clutch. It is obviously a very simple matter to get at the nuts 23 through the inspection plate opening in the fly wheel housing to adjust the clutch whenever it becomes necessary. In the original assembling of the clutch at the factory the springs are assembled with their levers on the back of the pressure plate and form a unitary assembly which in turn may be assembled on the back of the fly wheel with comparative ease. The simplicity, sturdiness, and economy of the construction are also believed to be apparent.

Referring now to Figs. 3 and 4, which show a modified or alternative construction in a clutch of the push type, that is, one in which the disengagement of the clutch is brought about by forward movement of the throw-out sleeve 13' instead of by the rearward movement thereof, the levers 11' in this construction are cast or forged to provide a forked outer end 31 for pivotal mounting, as at 15', in lugs 16' provided on the pressure plate 10. The posts 20 extending rigidly from the back of the fly wheel 5 pass through openings 21 in the pressure plate 10, as in the other form, and have nuts 23' threading on the rearward ends thereof, as shown. The nuts 23' have annular grooves 32 in the shanks thereof for the fulcruming of the levers 11', as indicated at 33, there being lugs 34 provided on the levers 11' in the crotch of the forked outer ends thereof to enter the grooves 32, as shown. Note that the fulcrum point 33 is displaced radially inwardly with reference to the pivot points 15'. Thus, movement of the levers 11' in a counter-clockwise direction about their fulcrum points 33 results in movement of the pressure plate 10 toward the fly wheel 5, as distinguished from the clockwise movement of the levers 11 required to produce a similar movement of the pressure plate 10 in the form illustrated in Figs. 1 and 2. The levers 11' in the present form are normally urged to rock in a counter-clockwise direction through the instrumentality of springs 12' mounted on pins 15' received in openings in the lugs 16'. It will be observed that the springs 12' have one active end 18' thereof bearing against the forward side of the levers 11' while the other active end 19' of said springs bears against the back of the pressure plate 10. The springs 12' are practically identical to the springs 12 employed in the other form. The operation of this clutch is not believed to require any further explanation, as it is obviously the converse of that of the form first described, namely, the forward movement of the throw-out sleeve 13' results in the disengagement of the clutch while rearward movement thereof results in the engagement of the clutch.

We claim:

1. In a friction clutch, the combination with a driving member, such as a fly-wheel, a driven member, such as a clutch disk, and a pressure plate for frictionally engaging the driving and driven members, of a plurality of posts on the fly-wheel extending rearwardly therefrom in lieu of a back plate on the fly-wheel, the pressure plate having openings therein to receive said posts whereby to maintain the pressure plate in proper position, lugs projecting rearwardly on the back of the pressure plate adjacent the aforesaid openings, a plurality of levers pivotally mounted on said lugs for rocking movement, adjusting nuts threadedly engaged on said posts and bearing against said levers in radially spaced relation with respect to the said pivotal mountings thereof on the pressure plate whereby rocking motion communicated to the levers results in movement of the pressure plate relative to the fly-wheel, and springs disposed adjacent the pivotal mountings of the levers on said lugs and acting between the pressure plate and said levers tending normally to rock the levers in one direction to move the pressure plate toward the fly-wheel so as to engage the clutch.

2. A clutch as set forth in claim 1 wherein the lugs on the pressure plate have pins thereon and wherein the spring means comprises a plurality of springs of the door-spring type, one for each of the levers, said springs having a coiled intermediate portion received on the said pins and having one active end bearing against the pressure plate and the other active end bearing against the levers for the purpose described.

3. In a friction clutch, the combination with a driving member, such as a fly-wheel, a driven member, such as a clutch disk, and a pressure plate for frictionally engaging the driving and driven members, of a plurality of posts on the fly-wheel extending rearwardly therefrom in lieu of a back plate on the fly-wheel, the pressure plate having openings therein to receive said posts whereby to maintain the pressure plate in proper position, lugs projecting rearwardly on the back of the pressure plate adjacent the aforesaid openings, a plurality of levers having forked outer ends straddling the posts and arranged to rock with respect thereto, the forked ends of said levers being pivotally mounted on said lugs in radially spaced relation with respect to the posts, whereby rocking motion communicated to the levers results in movement of the pressure plate relative to the fly-wheel, and springs acting between the pressure plate and said levers tending normally to rock the levers in one direction to move the pressure plate toward the fly-wheel to engage the clutch.

4. A clutch as set forth in claim 3, including adjusting nuts threadedly engaged on said posts, said nuts being annularly grooved for the reception of parts in the crotches of the forked outer ends of said levers, whereby the rocker mounting of said levers on said posts is arranged to be adjusted by adjustment of said nuts.

5. A clutch as set forth in claim 3, including an adjusting nut threading on each of said posts and received within the forked outer end of the lever straddling a post, the nut member serving to provide a rocker mounting for the lever member on the post, the one member having a groove therein and the other member having a part received in said groove, whereby adjustment of the nut on the post serves to adjust the rocker mounting of the lever.

6. In a friction clutch, the combination with a driving member, such as a fly-wheel, a driven member, such as a clutch disk, and a pressure plate for frictionally engaging the driving and driven members, of a plurality of posts on the fly-wheel extending rearwardly therefrom in lieu of a back plate on the fly-wheel, the pressure plate having openings therein to receive said posts whereby to maintain the pressure plate in proper position, lugs projecting rearwardly on the back of the pressure plate adjacent the aforesaid openings, a plurality of levers disposed nearly radially with reference to the back of the pressure plate, and having forked outer ends straddling the projecting ends of the posts and arranged for rocking movement with respect thereto, the forked outer ends of said levers being pivotally mounted on the lugs of the pressure plate in radially outwardly spaced relation with respect to the posts, whereby rocking motion communicated to the levers results in movement of the pressure plate relative to the fly-wheel, pins mounted on said lugs between the pressure plate and the levers in radially inwardly spaced relation with reference to the posts, and coiled torsion springs mounted on said pins, having one projecting active end bearing against the pressure plate and the other projecting active end bearings against the levers, whereby normally to tend to rock the levers in one direction to move the pressure plate toward the fly-wheel to engage the clutch.

7. In a clutch as set forth in claim 6, wherein each of said levers has an outwardly projecting part in the crotch of the forked outer end thereof, an adjusting nut threadedly engaged on the post and received within the forked outer end of the lever, the said nut being annularly grooved for the reception of said part, whereby the rocker mounting of the lever on the post is arranged to be adjusted by adjustment of said nut.

8. A clutch as set forth in claim 6 including an adjusting nut threading on each of said posts and received within the forked outer end of the lever straddling a post, the nut member serving to provide a rocker mounting for the lever member on the post, the one member having a groove therein and the other member having a part received in said groove, whereby adjustment of the nut on the post serves to adjust the rocker mounting of the lever.

9. In a friction clutch, the combination with a driving member, such as a fly-wheel, a driven member, such as a clutch disk, and a pressure plate for frictionally engaging the driving and driven members, of a plurality of posts on the fly-wheel extending rearwardly therefrom in lieu of a back plate on the fly-wheel, the pressure plate having openings therein to receive said posts whereby to maintain the pressure plate in proper position, lugs projecting rearwardly on the back of the pressure plate adjacent the aforesaid openings, a plurality of levers pivotally mounted on said lugs and having engagement with parts on the posts in radially spaced relation with respect to the pivot points for rocking movement with reference to the posts, such movement of the levers resulting in movement of the pressure plate relative to the fly-wheel, pins mounted on said lugs in cross-wise relation to the levers and door springs mounted on said pins, each spring being of a one-piece double-coiled type with the coils thereof disposed on the pin on opposite sides of the lever associated with the pin, the one active end of the spring bearing against the pressure plate and the other active end bearing against the lever for the purpose described.

ALBERT E. GORANSON.
MARTIN E. WILLENE.